United States Patent Office 3,118,900
Patented Jan. 21, 1964

3,118,900
SUBSTITUTED DERIVATIVES OF 3-AZA-6,7-BENZO-8-OXA-5-PHENYLBICYCLO[3.3.1]-NONANE
Harold Elmer Zaugg, Lake Forest, and Robert William De Net, Waukegan, Ill., assignors to Abbott Laboratories, North Chicago, Ill., a corporation of Illinois
No Drawing. Filed Jan. 15, 1962, Ser. No. 166,391
10 Claims. (Cl. 260—294.7)

This invention is concerned with new chemical compounds of the formula

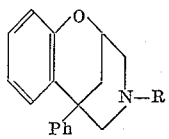

and a method for their preparation. In this and succeeding formulas, Ph represents phenyl and R is benzyl, phenethyl, cyclopropyl, or homoveratryl. These compounds are analgesics as well as barbiturate potentiators. In a representative operation, mice were first injected intraperitoneally for 30 minutes with 3-aza-6,7-benzo-3-cyclopropyl-8-oxa-5-phenylbicyclo[3.3.1]nonane at a dosage of 59 mg./kg. and then challenged with an intraperitoneal injection of 60 mg./kg. of sodium pentobarbital. It was found that the duration of sleep compared to the controls injected only with the barbiturate increased 370%.

The new compounds can be prepared in their free base form by the reaction of at least one molecular proportion of an amine of the formula $RNH_2$ with one molecular proportion of methyl cis-2-bromomethyl-4-phenyl-4-chromancarboxylate at a temperature of from 70° C. to the reflux temperature of the reaction mixture to form an intermediate compound of the formula

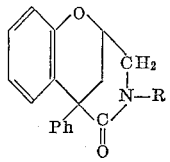

which is thereafter reduced by refluxing with lithium aluminum hydride in ether. Acid addition salts of the new compounds are readily obtained by reaction of their free bases with ethereal hydrogen chloride, sulfuric acid, acetic acid, benzoic acid, hydrogen bromide and the like.

The following examples are presented to illustrate rather than limit the invention.

EXAMPLE 1

3-Aza-6,7-Benzo-3-Benzyl-8-Oxa-5-Phenylbicyclo-[3.3.1]Nonane

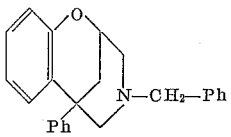

In the first step of the reaction, 54 g. (0.149 mole) of methyl cis-2-bromomethyl-4-phenyl-4-chromancarboxylate and 75 ml. of benzylamine was heated on the steam bath for 24 hours. The excess benzylamine was then removed by distillation under reduced pressure and the residue stirred with 500 ml. of dry ether. The resulting solid was collected by filtration and slurried with 400 ml. of water to dissolve the benzylamine hydrobromide. The insoluble product was removed by filtration and after recrystallization from ethanol melted at 151°–152° C. This intermediate product was 3-aza-6,7-benzo-3-benzyl-4-keto-8-oxa-5-phenylbicyclo[3.3.1]nonane of the formula which upon analysis was found to contain 81.06% carbon and 6.23% hydrogen compared to the calculated values for $C_{24}H_{21}NO_2$ of 81.10% carbon and 5.96% hydrogen.

In the second step of the reaction, 8 g. (0.022 mole) of the intermediate previously prepared was added portion-wise to 2.2 g. (0.56 mole) of lithium aluminum hydride suspended in 400 ml. of ether. The mixture was stirred and refluxed for 24 hours to reduce the keto group at the 4-position of the intermediate. After cooling to room temperature, excess hydride was decomposed by the successive drop-wise addition of 3 ml. of water, 3 ml. of 10% aqueous sodium hydroxide and 2 ml. of water. Upon filtration, the filter cake was washed with ether and the combined filtrates dried over anhydrous magnesium sulfate. Treatment of the dried filtrate with excess ethereal hydrogen chloride precipitated the hydrochloride of the reduced intermediate which upon recrystallization from ethanol melted at 145°–147° C.

Analysis.—Calc'd for $C_{24}H_{24}ClNO$: C=76.27%; H=6.41%; N=3.71%. Found: C=76.37%; H=6.46%; N=3.54%.

EXAMPLES 2–4

By substituting phenethylamine, homoveratrylamine or cyclopropylamine for benzylamine in Step 1 of Example 1, there is readily obtained the following intermediates respectively:

(a) 3-aza-6,7-benzo-4-keto-3-(β-phenethyl) - 8 - oxa-5-phenylbicyclo[3.3.1]nonane melting at 95°–96° C.

(b) 3-aza-6,7-benzo-4-keto-3-homoveratryl - 8 - oxa-5-phenylbicyclo[3.3.1]nonane melting at 137°–138° C.

(c) 3-aza-6,7-benzo-4-keto-3-cyclopropyl - 8 - oxa-5-phenylbicyclo[3.3.1]nonane melting at 163°–164° C.

Reduction of these intermediates with lithium aluminum hydride as described in Step 2 of Example 1 will produce the following compounds respectively:

3-aza-6,7-benzo-8-oxa-3-(β-phenethyl) - 5 - phenylbicyclo[3.3.1]nonane melting at 99°–100° C. which upon treatment with ethereal hydrogen chloride forms the HCl salt melting at 243°–245° C. with decomposition;

3-aza-6,7-benzo-8-oxa - 3 - homoveratryl - 5 - phenylbicyclo[3.3.1]nonane melting at 104°–105° C. which upon treatment with ethereal hydrogen chloride forms the HCl salt melting at 223°–224° C. with decomposition;

3 - aza - 6,7 - benzo - 8 - oxa-3-cyclopropyl-5-phenylbicyclo[3.3.1]nonane melting at 102°–103° C. which upon treatment with ethereal sulfuric acid forms the sulfate dihydrate salt melting at 179°–180° C. with decomposition.

Methyl cis-2-bromomethyl-4-phenyl-4-chromancarboxylate employed as a starting material in the present invention is prepared by the reaction at room temperature of equimolar proportions of sodium methoxide in methanol and the diastereoisomer of 3-(2′,3′-dibromopropyl)-3-phenyl-2-benzofuranone melting at 99°–101° C. Upon completion of the reaction, the desired product is isolated by cooling the reaction mixture followed by filtration and after recrystallization from methanol melts at 108° C. The reaction of 3-allyl-3-phenyl-3-benzofuranone with an equimolecular proportion of bromine in chloroform at a temperature of about 0° C. followed by removal of the chloroform and subsequent fractional crystallization from absolute alcohol results in the formation of one diastereoisomer of 3-(2′,3′-dibromopropyl)-3- phenyl-2-benzofuranone melting at 99°–101° C. and another diastereoisomer melting at 137°–138° C.

We claim:

1. A compound selected from the group consisting of compounds of the formula:

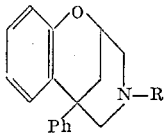

and their non-toxic, pharmaceutically acceptable, acid-addition salts wherein Ph is phenyl and R is a member of the group consisting of benzyl, cyclopropyl, phenethyl and homoveratryl.

2. 3-aza - 6,7 - benzo-3-benzyl-8-oxa - 5 - phenylbicyclo[3.3.1]nonane.

3. 3-aza - 6,7 - benzo-8-oxa-3-(β-phenethyl)-5-phenylbicyclo[3.3.1]nonane.

4. 3-aza - 6,7-benzo-8-oxa-3-homoveratryl-5-phenylbicyclo[3.3.1]nonane.

5. 3-aza - 6,7 - benzo-8-oxa-3-cyclopropyl-5-phenylbicyclo[3.3.1]nonane.

6. A method for the preparation of a compound of the formula

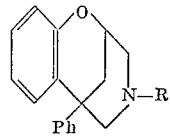

wherein Ph is phenyl and R is a member of the group consisting of benzyl, cyclopropyl, phenethyl and homoveratryl which comprises reacting at least one molecular proportion of an amine of the formula $RNH_2$ wherein R is as previously defined with one molecular proportion of methyl cis-2-bromomethyl-4-phenyl-4-chromancarboxylate at a temperature of from 70° C. to the reflux temperature of the reaction mixture and thereafter reducing the intermediate thus formed with ethereal lithium aluminum hydride at the reflux temperature of the reaction mixture.

7. A method as claimed in claim 6 in which the amine employed is benzylamine.

8. A method as claimed in claim 6 in which the amine employed is phenethylamine.

9. A method as claimed in claim 6 in which the amine employed is cyclopropylamine.

10. A method as claimed in claim 6 in which the amine employed is homoveratrylamine.

No references cited.